US012759726B2

(12) United States Patent
Said et al.

(10) Patent No.: US 12,759,726 B2
(45) Date of Patent: Oct. 13, 2026

(54) SYSTEMS AND METHODS FOR IMPLEMENTING LIGHTWEIGHT AND RELIABLE HYBRID OR ELECTRIC POWERTRAINS FOR AIRCRAFT

(71) Applicant: Zunum Aero, Inc., Bothell, WA (US)

(72) Inventors: Waleed Said, Rockford, IL (US); Rajib Datta, Niskayuna, NY (US); Matt Feddersen, Arlington Heights, IL (US); Shashank Natesh, Agonquin, IL (US)

(73) Assignee: Zunum Aero, Inc., Redmond, WA (US)

( * ) Notice: Subject to any disclaimer, the term of this patent is extended or adjusted under 35 U.S.C. 154(b) by 0 days.

(21) Appl. No.: 19/052,155

(22) Filed: Feb. 12, 2025

(65) Prior Publication Data

US 2026/0015099 A1 Jan. 15, 2026

Related U.S. Application Data

(63) Continuation of application No. 17/694,523, filed on Mar. 14, 2022, now Pat. No. 12,246,847, which is a (Continued)

(51) Int. Cl.
*B64D 41/00* (2006.01)

(52) U.S. Cl.
CPC .......... *B64D 41/00* (2013.01); *B64D 2221/00* (2013.01)

(58) Field of Classification Search
CPC ..... B64D 41/00; B64D 2221/00; H02J 1/084; H02J 2105/32; Y02T 50/40
See application file for complete search history.

(56) References Cited

U.S. PATENT DOCUMENTS

| | | | |
|---|---|---|---|
| 7,194,353 | B1 | 3/2007 | Baldwin et al. |
| 7,606,641 | B2 | 10/2009 | Allen |

(Continued)

FOREIGN PATENT DOCUMENTS

| | | | |
|---|---|---|---|
| EP | 2441632 | A1 | 4/2012 |
| EP | 2985901 | A1 | 2/2016 |

(Continued)

OTHER PUBLICATIONS

Notification of Transmittal of the International Search Report and the Written Opinion of the International Searching Authority, or the Declaration, App. No. PCT/US2019/047114, Mailed Dec. 4, 2019, 17 Pages.

(Continued)

*Primary Examiner* — Elim Ortiz
(74) *Attorney, Agent, or Firm* — Berkeley Law & Technology Group, LLP

(57) ABSTRACT

This invention pertains to reliable, lightweight and efficient hybrid electric powertrain and components thereof to power hybrid electric aircraft from one or more sources of electrical energy. In particular, a novel architecture is proposed for power panels that receive, condition and distribute high levels of electrical power to and from the propulsion electric motors and the one or several sources of electrical energy. Systems and methods for architecting the power panels using efficient, reusable and modular power electronics building blocks (PEBBs) is described, along with additional systems and methods for the optimal control of the power panels and components thereof. In addition, novel systems and methods are described for the efficient and lightweight thermal management for hybrid electric powertrain components, ranging from distribution manifolds for the powertrain or power panels, to micro fluid channels for cooling electronics with extreme heat flux. Additional disclosures (Continued)

are made pertaining to fail-safe architectures for plug-in series hybrid-to-electric powertrain, to the efficient in-ground charging of the stored electric energy sources, to the efficient control of permanent magnet generators, and to novel inverter technologies for the hybrid electric powertrain.

21 Claims, 8 Drawing Sheets

Related U.S. Application Data continuation of application No. 16/717,902, filed on Dec. 17, 2019, now Pat. No. 11,312,503.

(60) Provisional application No. 62/780,660, filed on Dec. 17, 2018.

(56) References Cited

U.S. PATENT DOCUMENTS

| | | | | |
|---|---|---|---|---|
| 10,322,824 | B1 | 6/2019 | Demont et al. | |
| 10,501,194 | B2 | 12/2019 | Knapp et al. | |
| 10,589,635 | B1 | 3/2020 | Solodovnik et al. | |
| 2005/0052080 | A1 | 3/2005 | Maslov et al. | |
| 2007/0164693 | A1* | 7/2007 | King | B60L 50/51 318/109 |
| 2008/0184906 | A1 | 8/2008 | Kejha | |
| 2010/0236851 | A1* | 9/2010 | Van Maanen | B60L 3/0046 180/65.265 |
| 2011/0050173 | A1* | 3/2011 | King | H02J 1/10 320/128 |
| 2011/0050174 | A1* | 3/2011 | King | B60L 53/20 320/134 |
| 2011/0100735 | A1* | 5/2011 | Flett | B60L 50/13 180/65.285 |
| 2012/0025032 | A1 | 2/2012 | Hopdjanian et al. | |
| 2012/0209456 | A1 | 8/2012 | Harmon | |
| 2013/0261914 | A1 | 10/2013 | Ingram et al. | |
| 2014/0010652 | A1 | 1/2014 | Suntharlingam et al. | |
| 2014/0129139 | A1 | 5/2014 | Ellison et al. | |
| 2016/0236790 | A1 | 8/2016 | Knapp et al. | |
| 2016/0280386 | A1 | 9/2016 | Mestler et al. | |
| 2017/0057650 | A1 | 3/2017 | Walter-Robinson | |
| 2018/0079515 | A1 | 3/2018 | Harwood et al. | |
| 2018/0134400 | A1 | 5/2018 | Knapp et al. | |
| 2018/0201142 | A1 | 7/2018 | Galin et al. | |
| 2018/0244398 | A1 | 8/2018 | Woodhouse et al. | |
| 2018/0346139 | A1 | 12/2018 | Ferran et al. | |
| 2019/0263519 | A1 | 8/2019 | Argus | |
| 2020/0017228 | A1 | 1/2020 | Combs et al. | |
| 2020/0055610 | A1 | 2/2020 | Terwilliger et al. | |
| 2020/0056549 | A1 | 2/2020 | Terwilliger et al. | |
| 2020/0180454 | A1 | 6/2020 | Gao et al. | |
| 2020/0182637 | A1 | 6/2020 | Kumar et al. | |
| 2020/0290742 | A1 | 9/2020 | Kumar et al. | |
| 2020/0346769 | A1 | 11/2020 | Knapp et al. | |

FOREIGN PATENT DOCUMENTS

| | | | |
|---|---|---|---|
| FR | 3085667 | A1 | 3/2020 |
| WO | 2016093905 | A1 | 6/2016 |

OTHER PUBLICATIONS

Felder, et al, “Turboelectonic Distributed Propulsion Engine Cycle Analysis for Hybrid-Wing-Body Aircraft,” AIAA Aerospace Science Meeting, 47th AIAA Aerospace Sciences Meeting Including the New Horizons Forum and Aerospace Exposition Jan. 5-8, 2009, Orlando, Florida, 25 pages.

Office Action, U.S. Appl. No. 16/107,821, Mailed Mar. 12, 2020, 19 pages.

Response to Office Action, U.S. Appl. No. 16/107,821, filed Jul. 13, 2020, 18 pages.

Final Office Action, U.S. Appl. No. 16/107,821, Mailed Oct. 9, 2020, 26 pages.

RCE filed, U.S. Appl. No. 16/107,821, filed Jan. 11, 2021, 21 pages.

Office Action, U.S. Appl. No. 16/107,821, Mailed Feb. 16, 2021, 28 Pages.

Response to Office Action, U.S. Appl. No. 16/107,821, filed Jun. 16, 2021, 21 Pages.

Interview Summary, U.S. Appl. No. 16/107,821, Mailed Jul. 2, 2021, 3 Pages.

Notice of Allowance, U.S. Appl. No. 16/107,821, Mailed Aug. 20, 2021, 21 Pages.

Issue Fee, U.S. Appl. No. 16/107,821, filed Nov. 22, 2021, 18 Pages.

Issue Notification, U.S. Appl. No. 16/107,821, Mailed Dec. 15, 2021, 1 Page.

Office Action, U.S. Appl. No. 16/717,902, Mailed Oct. 16, 2020, 7 Pages.

Response to Office Action, U.S. Appl. No. 16/717,902, filed Jan. 20, 2021, 3 Pages.

Final Office Action, U.S. Appl. No. 16/717,902, Mailed Apr. 30, 2021, 18 Pages.

Response to Final Office Action, U.S. Appl. No. 16/717,902, filed Jul. 30, 2021, 13 Pages.

Notice of Allowance, U.S. Appl. No. 16/717,902, Mailed Nov. 26, 2021, 8 Pages.

Issue Fee, U.S. Appl. No. 16/717,902, filed Feb. 28, 2022, 20 Pages.

Issue Notification, U.S. Appl. No. 16/717,902, Mailed Apr. 6, 2022, 1 Page.

Office Action, U.S. Appl. No. 17/694,523, Mailed Jan. 31, 2024, 6 pages.

Response to Office Action, U.S. Appl. No. 17/694,523, filed Jul. 25, 2024, 20 pages.

Supplemental Response to Office Action, U.S. Appl. No. 17/694,523, filed Aug. 15, 2024, 15 pages.

Notice of Allowance, U.S. Appl. No. 17/694,523, Mailed Oct. 23, 2024, 16 pages.

Issue Fee & Rule 312 Amendment, U.S. Appl. No. 17/694,523, filed Jan. 23, 2025, 19 pages.

Issue Notification, U.S. Appl. No. 17/694,523, Mailed Feb. 19, 2025, 2 pages.

* cited by examiner

600

SYSTEMS AND METHODS FOR IMPLEMENTING LIGHTWEIGHT AND RELIABLE HYBRID OR ELECTRIC POWERTRAINS FOR AIRCRAFT

CROSS REFERENCE TO RELATED APPLICATIONS

This application is a continuation of U.S. patent application Ser. No. 17/694,523 titled Systems and Methods for Implementing Lightweight and Reliable Hybrid or Electric Powertrains for Aircraft, filed on Mar. 14, 2022, issued as U.S. Pat. No. 12,246,847 on Mar. 11, 2025, which is a continuation of U.S. patent application Ser. No. 16/717,902 titled Systems and Methods for Implementing Lightweight and Reliable Hybrid or Electric Powertrains for Aircraft, filed on Dec. 17, 2019, issued as U.S. Pat. No. 11,312,503 on Apr. 26, 2022, which claims the benefit of U.S. Provisional Patent Application No. 62/780,660 entitled Systems and Methods for Hybrid Electric Aircraft Powertrains, filed on Dec. 17, 2018, the entire disclosure of which is incorporated herein by reference. This application is related to U.S. patent application Ser. No. 16/107,821 entitled System Controller for Series Hybrid Powertrain, filed on Aug. 21, 2018, issued as U.S. Pat. No. 11,214,378 on Jan. 2, 2022, the entire disclosure of which is incorporated herein by reference.

BACKGROUND

Transportation systems and transport platforms are an important part of the infrastructure used to enable commerce and the movement of people between locations. As such, they are essential services for the growth of an economy and the development of a society. Over the years, several types of transportation systems have been developed, each typically with their own focus, advantages and drawbacks.

A key challenge for transportation is the developing "gap" over regional distances, where much of the world is left without a high-speed mode. Competitive pressures have driven a 70-year decline of air over these distances. And the impact of high-speed rail is limited by economics to a few dense corridors. As a result, the last time the US travel survey was conducted in 2001, 90 percent of all long-distance trips were over regional distances from 50 to 500 miles. Yet just 2 percent of these were by air, with auto at a staggering 97 percent. This has had a tremendous impact on mobility and economic development. Regional door-to-door mobility has stagnated: travel times by highway have not improved for decades; and flight times have stretched given slower cruise speeds and increasingly congested airports. Meanwhile, the steady consolidation of air services to a declining set of major hubs has left many communities disconnected from the global air network, with severe impact on their economy and ability to attract investment.

This bleak landscape is poised for dramatic change as sharing, electrification and autonomy converge to enable fast and flexible regional transport at scale. Intra-urban travel is already being reshaped by ridesharing, car sharing, car and van pooling. Electric vehicles and driverless technologies will take this further. Lower fares, improved productivity and reduced congestion will dramatically expand utility and extend range. Crucially, as recognized by the inventors, the transformation on the ground will take to the skies, extending impact of this "new transport" to regional, and eventually, intracontinental ranges. A new breed of small to mid-sized hybrid electric aircraft will usher in a golden era of regional air. Frequent departures of smaller aircraft from a large number of smaller airfields will enable air travel much faster than today and at much lower fares. Over time, rapidly improving batteries will further reduce costs and extend range, while increasing acceptance of drones will gradually reduce the need for pilots onboard, accelerating the trend.

As recognized by the inventors, this scale-out of air transport via small to mid-sized aircraft flying regional ranges is a direct result of the unique operating economics of range-optimized hybrid electric aircraft, enhanced further by future autonomy. While conventional aircraft are particularly suited for moving large number of people over great distances, and do not operate efficiently over shorter (e.g., regional) distances, at smaller sizes, and with fewer passengers. In contrast, hybrid electric aircraft are free of the scale and range economics that plague regional aviation today. Smaller electric aircraft can fly as efficiently as larger ones. And relatively small electrics flying regional are competitive with the largest conventional jets flying long-haul. Released from the constraints of scale and range, operators will mold aircraft, frequency and routes to travel patterns. The air network that emerges will be distributed, with frequent flights to a large number of community and urban airports, a contrast to the concentrated network of today.

Embodiments described herein relate to aspects important to the arrival of hybrid electric aviation, such as the development of reliable, lightweight and efficient hybrid electric powertrain and components thereof to power hybrid electric aircraft from one or more sources of electrical energy.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Briefly, this disclosure pertains to reliable, lightweight and efficient hybrid electric powertrain and components thereof to power hybrid electric aircraft from one or more sources of electrical energy. In particular, a novel architecture is proposed for power panels that receive, condition and distribute high levels of electrical power to and from the propulsion electric motors and the one or several sources of electrical energy. Systems and methods for architecting the power panels (also referred to as "power center") using efficient, reusable and modular power electronics building blocks (PEBBs) is described, along with additional systems and methods for the optimal control of the power panels and components thereof. In addition, novel systems and methods are described for the efficient and lightweight thermal management for hybrid electric powertrain components, ranging from distribution manifolds for the powertrain or power panels, to micro fluid channels for cooling electronics with extreme heat flux. Additional disclosures are made pertaining to fail-safe architectures for plug-in series hybrid-to-electric powertrain, to the efficient in-ground charging of the stored electric energy sources, to the efficient control of permanent magnet generators, and to novel inverter technologies for the hybrid electric powertrain.

Further on the PEBBs, the power center is designed to serve as the single point interface between the aircraft systems and the power electronics modules (PEBBs), which can be integral to the powertrain. PEBBs can be designed to serve a range of functions such as an inverter, converter, rectifier, or any other power electronics component. Each PEBB is designed to be a modular unit which can be removed or installed in the power center with a minimum number of blind connections and very limited need for space to access, as is typical of aircraft installations. Single point, blind-blind connections to electrical power, controls and thermal management loops housed in the power center facilitate installation of PEBBs in limited space. For instance, the power center hosts one or more cooling system loops on manifolds allowing each PEBB to be added to the coolant loop through no-drip quick connect/disconnect blind attachments. Further details on the design of the power center and PEBBs are disclosed herein.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

Figure 1:
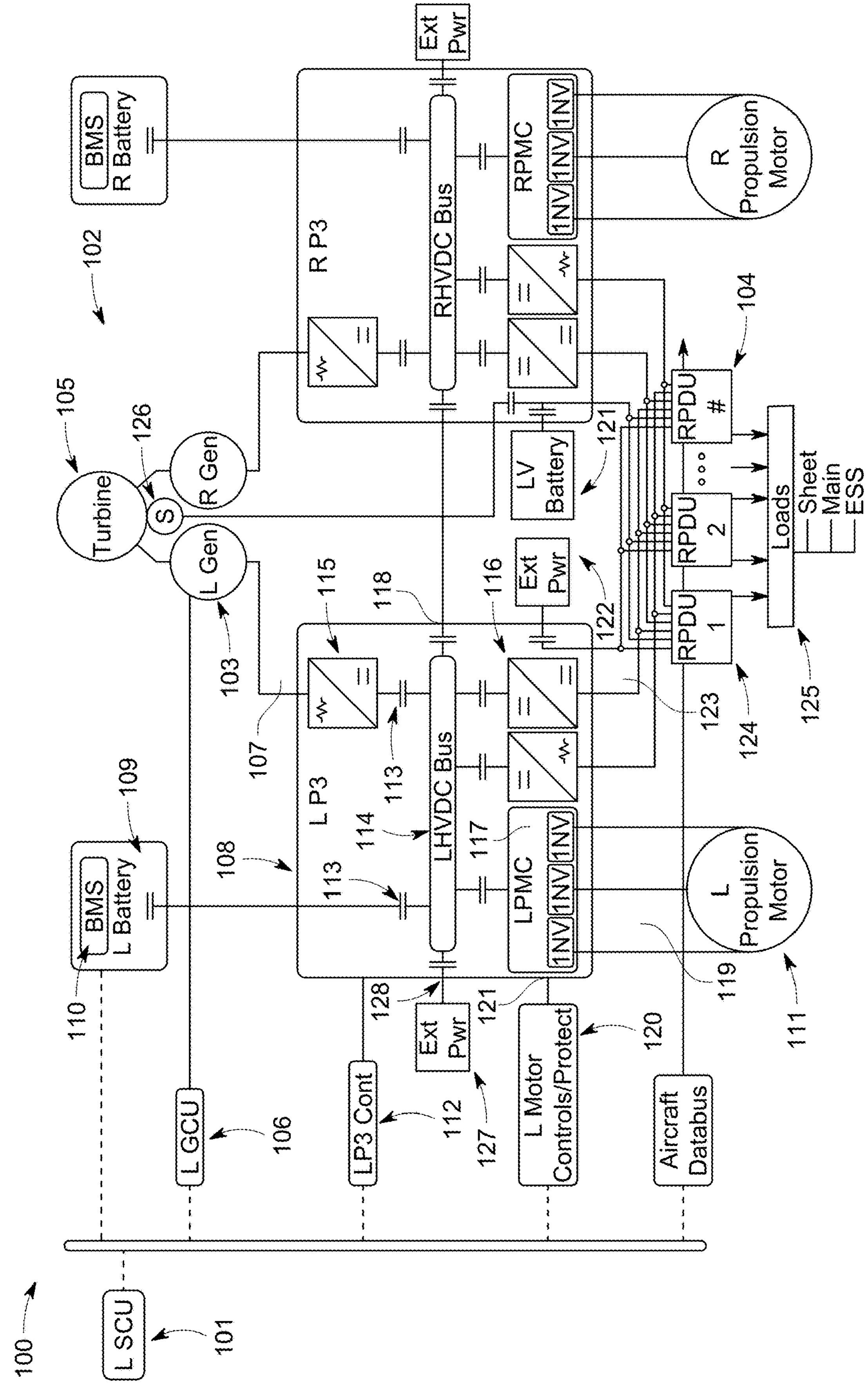
FIG. 1 is a schematic diagram illustrating an implementation of a plug-in series hybrid-to-electric powertrain and associated control system for a hybrid-to-electric aircraft of an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to “claimed subject matter” refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, embodiments described herein can relate to a system, as one or more methods, as one or more elements of an aircraft or transportation system, as one or more elements or functional modules of regional aircraft transportation system, or as one or more devices. Embodiments can include a hardware implemented embodiment, a software implemented embodiment, or an embodiment combining software and hardware aspects. For example, in some embodiments, one or more of the operations, functions, processes, or methods described herein for use in the flight control (or other form of control) of an aircraft or of a transportation system may be implemented by one or more suitable processing elements (such as a processor, microprocessor, CPU, controller, etc.) that is part of a client device, server, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, Following below are more detailed descriptions of various concepts related to, and embodiments of, inventive methods, apparatus and systems for facilitating implementation of a powertrain for hybrid electric aircraft. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Fail-Safe Hybrid Electric Powertrain and Secondary Electrical Systems

A hybrid electric aircraft is typically a type of an aircraft that may integrate and/or combine one or more stored electrical energy sources (e.g., batteries, supercapacitors, etc.) with one or more generated electrical energy sources (e.g., turbine-driven generators, fuel cells, etc.). A hybrid electric aircraft may employ a propulsion powertrain, such as a series hybrid powertrain, for example, as a source of propulsive power. In this context, "series hybrid powertrain" refers to a system of components or elements capable of generating, receiving, conditioning, and/or distributing electrical power from one or more electrical energy sources in order to drive or operate a particular electrical machine that provides mechanical power for an associated propulsion system.

As will be seen, electrical energy sources may comprise, for example, generated electrical energy sources and stored electrical energy sources. To illustrate, depending on an implementation, generated electrical energy sources may comprise, for example, electrical generators driven by turbines or powered by fuel cells, and stored electrical energy sources may comprise, for example, batteries or supercapacitors. Thus, depending on a particular power demand, which may be based, at least in part, on specific sections of a flight (e.g., takeoff, cruise, landing, etc.), a particular electrical energy source may provide a primary electromotive force, for example, and, in some instances, other electrical energy source may augment the primary source in a suitable manner, such as implemented via a so-called "power split" that determines the fraction of power delivered by each source.

In the following, we refer to a hybrid-to-electric aircraft or the hybrid-to-electric powertrain, which integrate and/or combine one or more stored electrical energy sources, with optionally one or more generated electrical energy sources. This enables the aircraft or powertrain to be offered with (hybrid electric) or without (electric) the optional generated electrical anergy sources installed. Further, this enables the optional generated electrical energy sources to be removed if installed previously such that the platform goes from hybrid electric to electric, or to be added-on if not installed previously, such that the platform goes from electric to hybrid electric. Such a design provides flexibility to accommodate the rapid development of electrical energy sources over the operating life of these platforms, and the wide range of applications anticipated. Aircraft and powertrain with generated electrical energy sources installed (hybrid electric) are ready for the transition to electric once technologies of the stored electrical energy sources improve sufficiently. Alternately, aircraft and powertrain on operations with appropriately short ranges could forgo the generated electrical energy sources altogether, when the stored electric energy sources are sufficient for these.

Furthermore, in the following, we refer to a "plug-in hybrid" or "plug-in hybrid-to-electric" powertrain as one where the stored electrical energy sources are designed to be charged to a significant degree by an external power source. This is most typically done via in-ground charging of the stored electrical energy sources by external power, although could be accomplished in the future by wireless charging while the aircraft is in flight. Alternately, the depleted stored electrical energy sources are swapped with ones that were previously charged by an external power source.

In general, it may be understood in what follows that "hybrid" or "hybrid electric" powertrain or aircraft refers to the entire class of powertrain or aircraft respectively that integrate and/or combine one or more stored electrical energy sources with one or more generated electrical energy sources. Hybrid-to-electric then is a subset of these whereby the one or more generated electrical energy sources is optional. Meanwhile, "electric" powertrain or aircraft refers to powertrain or aircraft that are powered by one or more stored electrical energy sources, with no provision for generated electrical energy sources whatsoever.

In a conventional aircraft, one of primary functions of an engine controller is to regulate a flow of fuel to a propulsion engine in order to produce suitable thrust. A typical aircraft engine controller, however, may not be applicable or otherwise useful to control an electromotive power flow in a hybrid electric powertrain utilized by a hybrid electric aircraft as a source of propulsion. In some instances, a powertrain may be controlled, at least in part, on a subsystem or component level, such as via sampling a directional feedback from a particular generated electrical energy source and returning a command signal to the source to affect powertrain's performance in some manner, such as via leveraging generated power output, for example. At times, however, this or like approaches may be less dynamic, such as in terms of a suitable and/or desired response by a hybrid electric powertrain to particular and/or changing load demands, for example, which may affect aircraft propulsion and/or overall powertrain performance. Accordingly, it may be desirable to develop one or more methods, systems, and/or apparatuses that may more effectively and/or more efficiently implement a system controller for a hybrid electric powertrain utilized by a hybrid electric aircraft as a source of propulsion.

For example, in some instances, one or more optimizations and/or improvements may include implementing and/or utilizing a feedback loop or like process outside of an internal control loop of a particular generated electrical energy source, which may facilitate and/or support more effective and/or more efficient powertrain performance and/or control. At times, one or more optimizations and/or improvements may include, for example, more effectively and/or more efficiently implementing a "power split," such as to facilitate and/or support particular power demands. In this context, "power split" refers to a proportion of electrical power delivery between a stored electrical energy source (e.g., a battery, supercapacitor, etc.) and a generated electrical energy source (e.g., an electrical generator, fuel cells, etc.).

Referring now to FIG. 1, which is a schematic diagram illustrating features of a plug-in series hybrid-to-electric powertrain, with an example operating environment 100 capable of facilitating and/or support one or more processes and/or operations for a system controller, such as an example left system controller unit (L SCU) illustrated generally at 101. In some instances, system controller 101 may be capable of controlling an operation of a powertrain, such as a plug-in series hybrid-to-electric powertrain 102. The plug-in series hybrid-to-electric powertrain 102 may, for example, be employed, in whole or in part, as a source of propulsive power and secondary electricals for a hybrid-to-electric electric aircraft. Thus, as illustrated, according to an implementation, powertrain 102 may comprise, for example, a number of elements or components capable of generating, receiving, conditioning, and/or distributing electrical power from one or more electrical energy sources, such as to drive or operate one or more particular electric machine(s) that provide mechanical power for an associated propulsion system(s). As seen in this example, a particular electric machine may comprise, for example, an electric motor, referenced at 10, that may provide mechanical power for an associated propeller, ducted fan, etc. (not shown). It should be noted that even though a certain number or elements or components of powertrain 102 are illustrated herein, any number of suitable elements or components may be implemented to facilitate and/or support one or more operations and/or techniques associated with example operating environment 100.

In addition, it should be appreciated that even though two powertrains are illustrated herein, such as for ease of discussion, any suitable number of powertrains may be associated with example operating environment 100. The two plug-in series hybrid-to-electric powertrain shown, for example, mirror each other and comprise the same or similar elements or components operatively and/or communicatively coupled to their own system controller unit 101, such as in the same or similar manner. The mirrored powertrains improve reliability, to address and/or mitigate a risk of failure via redundancy, or the like. As a way of illustration, a hybrid-to-electric electric aircraft may comprise, for example, of the two series hybrid-to-electric powertrains shown and these may be positioned on the right and left sides of the aircraft, such as to respectively power two electric motors in the same or similar manner. In this example, while the left system controller unit 101 (L SCU) controls the left powertrain, a second right system control unit (not shown), would control the right powertrain. Alternately, a single system control unit could be used control operations of the two powertrains, such as in the same and/or similar manner. Also, even though system controller 101 is illustrated schematically in connection with a single communication bus, any suitable number of communication buses, redundant or otherwise, may be implemented herein, such as to facilitate and/or support one or more operations and/or techniques associated with example operating environment 100.

In an implementation of a plug-in series hybrid-to-electric powertrain 102 may comprise, for example, optional generated electrical energy sources referenced as 103. In the implementation shown, the optional generated energy source may comprise, for example, one or more combustion engines 105 connected to generators 103, or one or more fuel cell 105 connected to voltage regulators 103. Generated electrical energy sources are generally known and need not be described herein in greater detail. As also seen, the optional generated electric energy source may be connected to controllers, referenced respectively for one of the sources as the left generator control unit 106 (L GCU). Controller 106 may, for example, be capable of controlling operations of optional components 105 and 103, by monitoring one or more applicable parameters (e.g., speed, voltage, switching frequency, torque, coolant temperatures, etc.) and/or communicating appropriate commands. These and/or other controllers discussed herein may, for example, be implemented via ay suitable technology, such as programmable integrated circuits, logic chips, control circuitry, etc. capable of facilitating and/or supporting one or more operations and/or techniques associated with example operating environment 100.

According to an implementation, as illustrated via a power flow path at 107, optional generated electrical energy source 105 may, for example, be electrically coupled to propulsion power panel 108. As also seen, a stored electrical energy source 109 may also be electrically coupled or propulsion power panel 108, such as via power flow path 110, for example. In this particular implementation, a stored electrical energy source may comprise, for example, a battery 109, which may be in the form of a rechargeable battery pack. Here, battery 109 may comprise, for example, its own controller, such as illustrated via a battery management unit (BMU) 110 so as to control flow of electric power to propulsion power panel 108.

The stored electrical energy source 109 may be designed to be recharged by external power sources, either by in-situ charging from an external source 127 via energy flow path 128, or by swapping source 109 with one that was recharged to a greater degree by an external power source. In addition, the stored electrical energy source 109 may be recharged by regenerative braking using the propulsion electric motor 111, or by the optional generated electrical energy source 105. Charging of the stored electrical energy source 109 is controlled by system controlled 101 working in concert with 110.

In some instances, propulsion power panel 108 may comprise, for example, an electrical sub-system or element having a matrix of electrical switches with associated conductive paths so as to route electric power from one or more applicable inputs to one or more applicable outputs. In the example shown, the power panel comprises electrical switches or contactors 113, a high-voltage DC bus 114 (L HVDC bus), AC to DC converters 115, DC to DC converters 116 and DC to AC inverters 117, collectively referred to as the Left Propulsion Motor controllers (L PMC). The converters and inverters are for the purpose of changing direct current (DC) into alternating current (AC, DC to AC inverters), changing AC to DC (AC to DC converters), or for changing the voltage levels of DC current (DC to DC converters). The converters and inverters shown may be implemented in any suitable manner, such as having suitable computing and/or processing resources (e.g., programmable chips, circuitry, memory, etc.) for example, to facilitate and/or support appropriate control process and/or more intelligent inverter operation.

Thus, as illustrated, power panel 108 may comprise a controller, referenced at 112 left propulsion power panel controller (LP3 Cont.), which may be capable of implementing a particular switching configuration of power panel 108, such as responsive to an appropriate command by system controller 101, for example. In some instances, a particular switching configuration may, for example, be implemented by turning on and/or off one or more electrical switches (and/or associated conductive paths) of power panel 108. For example, responsive to a command by system controller 101, controller 112 may implement a particular switching configuration of power panel 108 via routing electric power from optional generated electric energy source 105 to electric motor 111, while isolating stored electric energy source 109, just to illustrate one possible implementation. In some instances, controller 112 may also be capable of detecting operating parameters, conditions, faults, etc., of electrical switches, conductive paths, converters, etc. of power panel 108.

As further referenced vi a power flow path at 119, in an implementation, electric power from power panel 108 may, for example, be routed and/or delivered, as appropriate, to electric motor 111, suitable operation of which may be controlled by a motor controller 120, the Left Motor Controls/Protection. As was indicated, electric motor 111 may, for example, convert electric power into mechanical energy, such as to facilitate and/or support appropriate thrust for a hybrid-to-electric electric aircraft. Thus, electric motor 111 may be mechanically coupled to a suitable propulsor, such as a ducted fan, propeller, etc., for example, capable of generating such thrust. Depending on the specific implementation, motor controller 120 may comprise, for example, a stand-alone unit communicatively coupled to motor 111, such as via a link 121, though claimed subject matter is not so limited. For example, in some instances, motor controller 120 may be part of electric motor 111 (e.g., build-in, etc.). Motor controller 120 may, for example, be capable of controlling speed and/or torque of electric motor 111, communicating one or more operating parameters of electric motor 106 to system controller 101, determining health of electric motor 111, or the like. In some instances, motor controller 120 may comprise and/or be associated with inverters 117.

Also shown is an implementation of the secondary electrical system for the hybrid-to-electric aircraft, indicated generally by the arrow 104. In the example shown, the secondary electrical system may draw electric power at low voltage from the series hybrid-to-electric powertrain 102, a low voltage stored electrical energy source 121 (LV Battery), such as the battery pack shown, and/or an external power source 122 (Ext Pwr), typically engaged when the aircraft is stationary on the ground. The power is in form of both, low voltage AC and low voltage DC. Low voltage AC is sourced from the DC to AC converters 115 and/or external power 122. Low voltage DC is sourced from the DC to DC converters 116, and/or the low-voltage battery 121, and/or external power 122. The power is then delivered to remote power distribution units 124 (RPDU) via power flow paths 123, which condition the power for the range of secondary loads on the aircraft. Power may also be delivered to a starter 126 (S) that has the purpose of initiating operation of the optional generated electrical energy source 105.

As described extensively in U.S. patent application Ser. No. 16/107,821 titled "System Controller for Series Hybrid Powertrain," the entire disclosure of which is hereby incorporated by reference, in operative use, system controller 101 may interface with a pilot cockpit, aircraft management system, and/or one or more elements or components of powertrain 102 or secondary electrical system 104, such as via one or more appropriate communications. For example, system controller 101 may receive a signal indicative of a particular input from these or like systems, elements or components, and may perform one or more determinations and/or computations, such as based, at least in part, on the input. The system controller 101 may compute one or more values so as to achieve a desired proportion of power delivery between stored electrical energy source 109 and optional generated electrical energy source 105. System controller 101 may also compute one or more values to achieve a desired amount of power consumption by electric motor 111, for example. In addition, system controller 101 may, for example, make one or more determinations with respect to health of one or more elements or components of powertrain 102 or the secondary electrical system 104 and/or their operating capability. For instance, in case of failures of components in the left or right plug-in series hybrid-to-electric powertrain, the System controller may determine that the setting of the switch 118 should be adjusted to enable electrical power to flow across the two powertrains to compensate optimally for these failures.

Control of Permanent Magnet Generators for Hybrid Powertrain

In one embodiment, the hybrid electric powertrain with a generation source utilizes a wound-field synchronous generator that is fed to a passive diode rectifier to produce DC voltage. This DC voltage is connected in parallel with a stored electrical energy source to provide power to a propulsion electric motor. The generator output voltage and current are regulated to control the proportion of power delivered by the generator relative to the stored electrical energy source to the electric motor.

In an alternate implementation, a permanent magnet (PM) generator is utilized with an active rectifier to convert the AC output to DC. This DC voltage is again connected in parallel with a stored electrical energy source to provide power to the propulsion electric motor. In an embodiment, the proportion of power delivered by the PM generator relative to the stored electrical energy source connected in parallel is controlled by means of a control process to regulate the output current of the PM generator's active rectifier. The control process achieves this current regulation by controlling the shaft speed of the PM generator or by controlling the switching modes of the active rectifier, or a combination of the two. The preferred method is by controlling the switching modes of the active rectifier while maintaining the shaft of the PM generator at constant speed. Control of the shaft speed of the PM generator and/or the switching modes of the active rectifier can be done by any conventional means.

It is well known that in a circuit with two parallel voltage sources serving a load, rectified generator and stored electrical energy source in our embodiment, the source with the higher voltage will deliver greater power to the load. Since the two sources are in parallel, the actual voltage on the shared bus will be the same, therefore, the differential amount of current flowing from each voltage source is the only feedback available to control the proportion of power delivered by each.

This approach has the additional benefit of enabling a seamless transition between physical, encoder- or resolver-based, and sensor-less PM generator control in the event of encoder failure, improving the reliability of the hybrid powertrain. Rotor position information for controlling the flux and torque of a PM motor or generator is determined typically using a physical position encoder or a resolver. Sensor-less algorithms can also be applied to estimate the rotor position. These algorithms use voltage and current sensing to estimate the rotor or stator flux vector, magnitude and position. In our embodiment, both physical and sensor-less methods are applied simultaneously where the physical measurement is used primarily for flux and torque control. The physical measurement is also used to tune the sensor-less algorithm in real-time to ensure very close alignment of rotor or stator flux vectors determined by the two methods. In the event of any loss of communication between the encoder or resolver and the controller, or any loss of signal integrity, the control software is designed to switch to the sensor-less algorithm. Given the estimate of the flux vector by the sensor-less algorithm is closely aligned to that determined by the physical sensors, this transition from physical to sensor-less control is seamless. Once the algorithm is transitioned to sensor-less mode, it can continue in that mode for the remainder of the mission.

Power Electronics Building Block-Based Architecture for Propulsion Power Panels

In an embodiment, the propulsion power panels (also referred to as a "Power Center"), of the hybrid electric powertrain are architected to support modular Power Electronics Building Blocks (PEBBs) for the transfer of energy from sources to loads in a reusable, economical and efficient fashion, including appropriate DC and AC power conversion. Further, the Power Center to PEBB module interface is designed specifically for high power, limited access applications such as the hybrid or electric aircraft powertrain where space and weight are both at a premium. This is accomplished through deliberate design of the electrical, mechanical, and coolant interfaces between the Power Center and the PEBBs. In particular, while the Power Center carries full burden of meeting the integration requirements with the aircraft and powertrain, the interfaces with the PEBB is simplified to the minimum number of connections, made on the back of the module in the process of mechanically linking the module to the Power Center. By this means, connectivity to electrical power, control, and thermal management systems is achieved via blind, secure connections that mate as the PEBB is joined with the panel.

As specific example of a PEBB, consider a series hybrid powertrain as depicted in FIG. 1 in which both the generator 103 and electric motor 111 are permanent magnet (PM) machines, with each PM generator rated at 250 KW and each electric motor rated at 650 kW. An implementation of an AC-DC PEBB for this powertrain would be rated at 250 KW and designed to actively rectify power from a PM generator while controlling the delivered voltage. In such an implementation, each generator would be driven by one AC-DC PEBBs, and each electric motor would be driven by three DC-AC PEBBs. As a result, the current demand for each machine will be distributed roughly equally across the PEBBs, with some differential driven by dissimilar reactive power demands. The AC-DC PEBBs may be designed with additional thermal margins to allow higher frequency operation of the generator in situations where the generators is coupled directly to a high-speed turbine. In one example, the PEBB topology consists of a 6-switch 2-level converter with insulated-gate bipolar transistors (IGBT) and anti-parallel diodes. In another example, Silicon (Si) IGBTs and Silicon Carbide (SiC) diodes or SiC Metal Oxide Semiconductor Field Effect Transistors (MOSFET) can also be used. Alternate implementations may include multi-level topologies with Si or SiC switches.

According to an embodiment, the PEBBs include a control platform consisting of software and/or firmware and in which are implemented control algorithms. In one example, the control algorithms are based on field-oriented current control or torque control with feedback of AC-side currents, DC voltage and position information of the PM machines. In an another implementation, the control algorithm may leverage algorithms including direct torque or flux control. The PEBBs are commanded by a propulsion power panel controller described previously that runs outer control loops like voltage or speed control and generates current or torque commands. Fast protection against DC short-circuit, overcurrent, over-voltage, over-temperature is built into the PEBB. Protection across PEBBs is coordinated by the propulsion power panel controller which utilizes the modular nature of the system to enhance overall system reliability and safety as will be discussed further herein.

Figure 2:
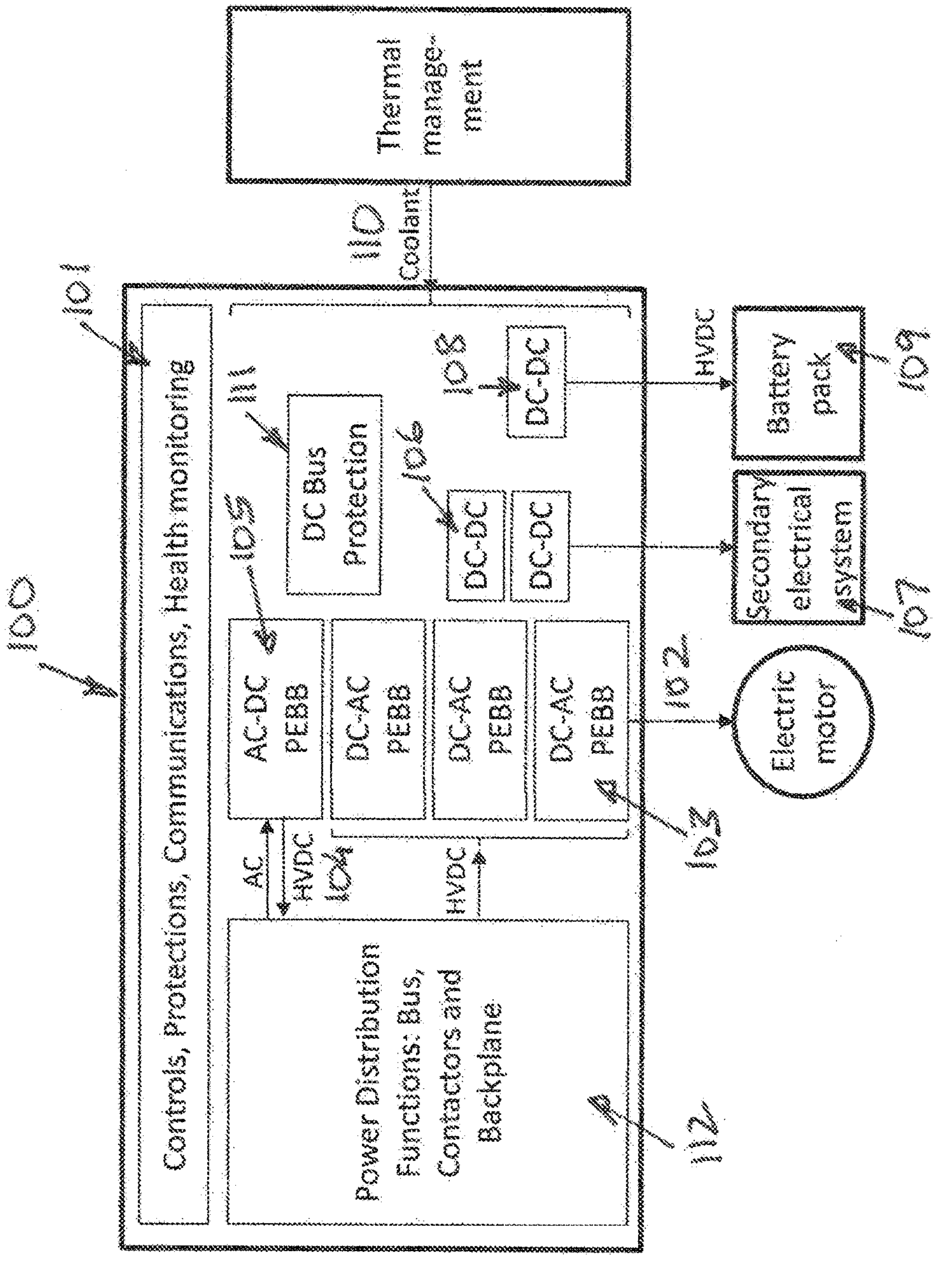
FIG. 2 is a functional diagram showing an embodiment of a PEBB-based hybrid power panel architecture of an embodiment.
Figure 3:
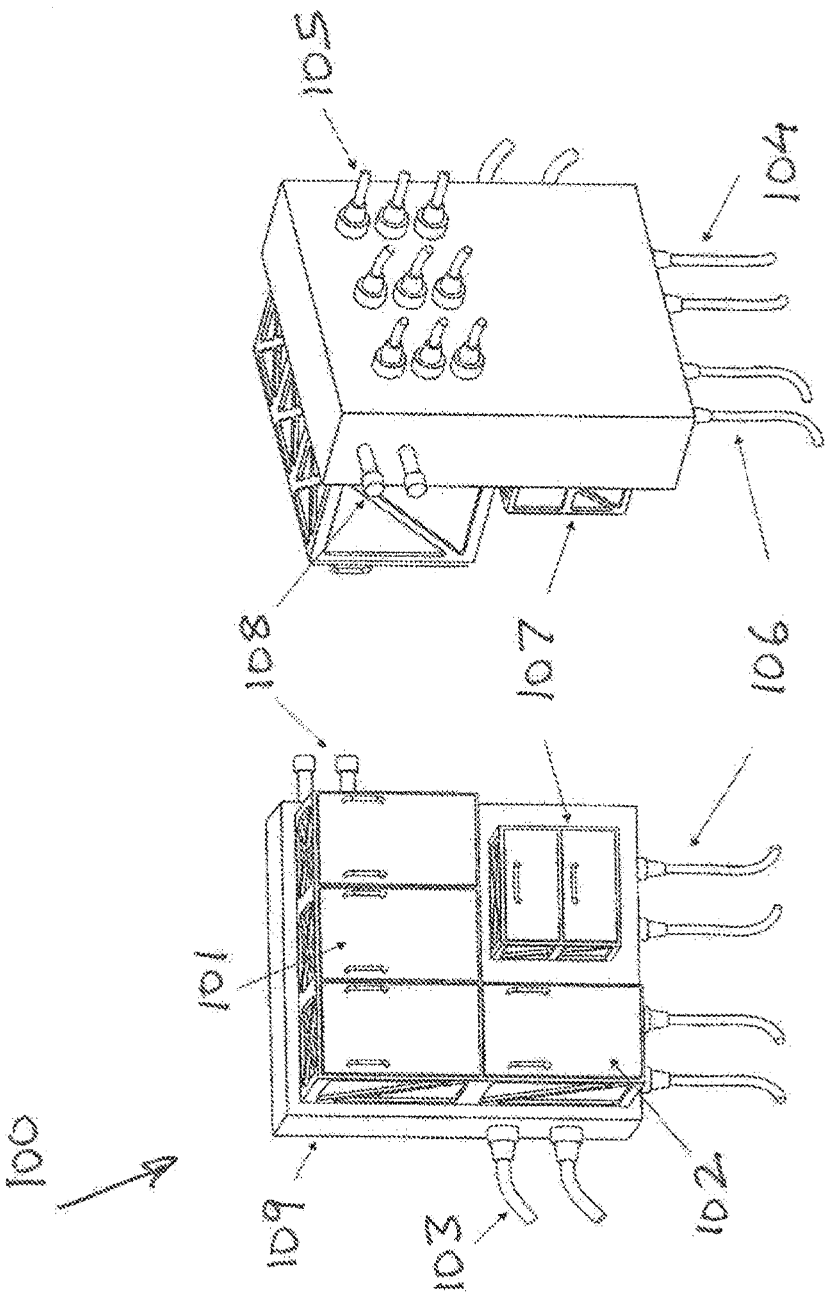
FIG. 3 shows the implementation of the PEBB-based hybrid power panel and its integration with the series hybrid powertrain and secondary electrical system of an embodiment.

FIG. 2 is a schematic of an embodiment of the Power Center with the PEBB-based hybrid power panel architecture, while FIG. 3 is an illustration of a Power Center physical implementation with modules installed. In addition to the features described previously, the Power Center architecture (ref. FIG. 2) includes centralized controls, protection, communications and health monitoring 101. The architecture allows for the summing of the output power 102 of the DC-AC PEBBs 103. The architecture also allows bi-directional power flow 104 such that regenerative power from the generator is supplied to charge the batteries via the AC-DC PEBB 105. This feature includes a means to contain regenerative power in the event the path to the batteries is not available. The architecture includes DC-to-DC converters 106 to supply low-voltage power to the secondary electrical system 107, and also includes additional DC-to-DC converters 108 for scenarios where control of the high-voltage batteries 109 is required. Thermal management is centralized, such that a single coolant flow 110 supports all components of the power panel. Similarly, Power Distribution Functions 112 such as the Bus, Contactors and Backplane, and DC Bus protection 111 is centralized.

Figure 8:
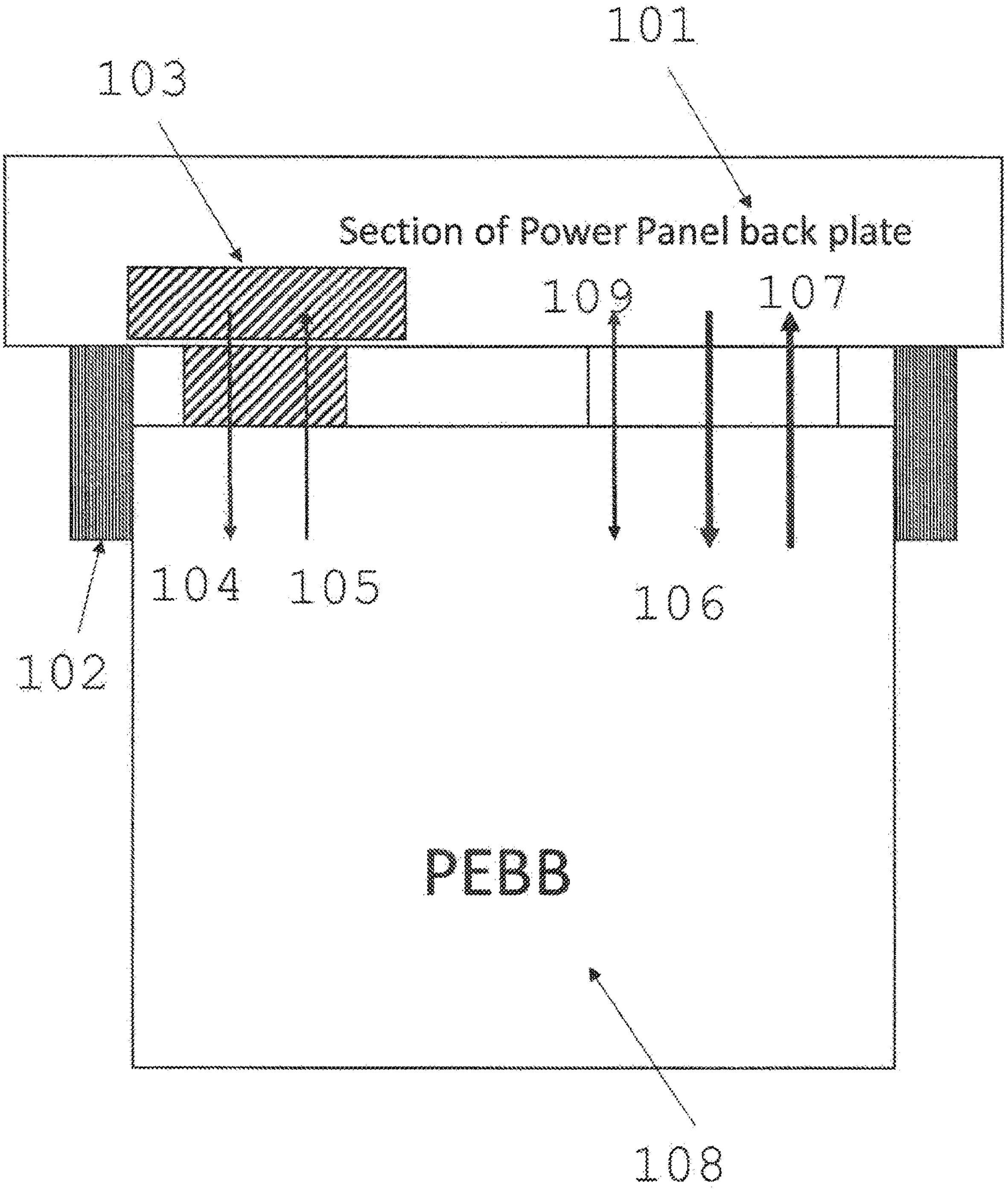
FIG. 8 is a schematic diagram illustrating the connection points between a Power Panel and a Power Electronic Building Block module.

FIG. 8 is a schematic showing the PEB 108 interfaces with the power center back plate 101, including the cooling fluid manifold 103 with fluid flowing into the PEBB 104 and return 105 through a single quick-connect interface. Similarly, electrical power connections are made with 106 and 107, along with control 109. In addition to the connection points for services, the PEBB is mechanically anchored to the back plate 102.

Several approaches to control the power split from the generated versus stored electrical energy sources are illustrated in FIG. 2: an AC-DC PEBB 105 to passively rectify power from a Wound-field generator and leveraging the generator control unit (GCU) to control the required voltage, an AC-DC PEBB to actively rectify power from a PM generator and control the generated voltage level, and (C) HVDC DC-DC 108 convertors to control the voltage of the stored electrical energy sources.

An example integration of the PEBBs described above is depicted in FIG. 3, which shows a propulsion power panel 109 of the series hybrid powertrain wherein the three removable DC-AC PEBB modules 101 and the one AC-DC PEBB module 102 are mounted on an interconnecting backplane 109. The PEBBs are designed for direct electrical integration to the propulsion power panel through the backplane in a plug-and-play configuration. The power panel includes connections 103 to a generated power source, a stored energy source 104 and outputs to the electric propulsion motor 105. The power panel also includes connections to the secondary electrical system 106 and DC-to-DC converters 107 to condition power for delivery to this system. The PEBBs are architected for the cooling medium to be supplied to the PEBBs without need for individualized plumbing as will be further described herein. As a result, the power panel, when utilizing a single fluid, single loop thermal control system, requires just a single pair of fittings for coolant inlet and outlet 108 from the ship's system. In case of a dual-loop, dual-fluid system, described further herein, there would be a second set of cooling fluid connectors to the backplane.

Novel Inverter Topologies for Hybrid Electric Powertrain

In a hybrid powertrain, power flow from the generator and to the electric motor is controlled by DC-to-AC and/or AC-to-DC power electronic converters. Typical voltage levels for aircraft on the DC side of these converters are 270V or +/−270V. Given the high power levels required of the generators and electric motors, ranging in the 100s of kW, the electric machines and power electronics (or PEBB as described previously) must be designed for high currents. For example, a 250 KW PEBB at 300Vac_rms output will need to have a current rating greater than 500 A. These high currents require cables with large cross-section to between the PEBB, the electrical machines and other power sources, driving a significant increase in the weight of the system.

Meanwhile, the AC fundamental frequency of power-dense direct-drive and/or high pole-count electric machines often used on hybrid electric aircraft can exceed 1 kHz. This necessitates semiconductor switches of high switching frequency to minimize torque ripple and machine losses, leading to high semiconductor losses in the PEBBs. For example, a 250 KW, 300V, 3-phase 6-switch 2-level (2L) converter with Si IGBTs and SiC Schottky diodes is about 96% efficient at 20 kHz switching frequency. In order to keep losses low, voltages on both DC and AC sides of the converters need to be raised. The 250 KW converter designed at 1 kV AC output and operating from 1.5 kVdc bus will have a current rating less than 200 A. As a result, the prior 2L topology would need to be designed to accommodate higher voltage devices. However, this leads to switching losses that are comparable or even greater than prior given higher voltage switches have higher switching losses.

This set of problems can be addressed by using multi-level topologies built with low-voltage semiconductor switches that enable lower switching frequency but achieve high power quality. Efficiency in the order of 98.5% is possible with Si devices and 99% with SiC devices or a hybrid comprised of Si and SiC devices. In addition, the multi-level converter produces lower dv/dt at the converter AC terminal that which has the additional benefit of lowering EMI and insulation stress on cables and electrical machine windings.

In an embodiment of this novel concept, the PEBB for either inverter or rectifier operation is built with a 3-level (3L) or greater topology. An example PEBB configuration can use 3L neutral-point clamped (NPC) topology that produces voltage levels of +Vdc, 0, −Vdc at the AC terminal. Both active and passive clamping topologies could be implemented. Other options are 3L neutral-point piloted (NPP) topology using series connected devices and AC-switches between the DC mid-point and AC terminals. Alternately, a different class of multi-level converter called modular multi-level converter (MMC) can be designed where the PEBB is a sub-module of the MMC topology.

In an embodiment, these topologies enable the voltage rating of individual semiconductor switches to be significantly reduced. For example, a 2L topology at 1.5 kV DC bus will require a switch with greater than 2 kV. A 3L topology for the same DC bus voltage can be built with 1200V devices, and a 5L topology with 600V devices. The use of low voltage devices, accompanied with lower switching frequency reduces semiconductor losses, improves power quality and reduces dv/dt. This translates to a much lighter powertrain, with significant benefit for hybrid electric aircraft.

DC-to-DC Converter for Hybrid Electric Powertrain

In a hybrid electric aircraft, the power to drive the propulsion electric motors is generated and delivered at as high voltage as is feasible at altitude to minimize losses and system weight. This is accomplished by means of a high-voltage propulsion electrical system. Meanwhile, a low-voltage secondary electrical system provides powers to a range of auxiliary loads such as avionics, cabin pressure, de-icing, landing gear etc. For example, while the propulsion electrical system operates at +/−270Vdc, standard aircraft electrical systems operate at voltages as low as 28Vdc and provide power for the majority of aircraft electrical equipment including avionics, lights, autopilot servos, landing gear actuation etc. The propulsion electrical system is not susceptible to high-frequency electromagnetic interference (EMI), however, the auxiliary loads, and in particular the avionics and controls, are very much impacted by EMI requiring adherence to stringent standards.

In an embodiment, the secondary DC voltage, 28Vdc for example, is derived from the primary DC voltage, +/−270Vdc for example, by step-down DC-to-DC converters that include EMI filtering to prevent any interference from the propulsion electrical system to the secondary electrical system. Since the power required by the secondary electrical system is a small fraction of that on the propulsion electrical system and the electromagnetic energy content is orders of magnitude smaller, the filters deployed are correspondingly smaller in size and weight. As noted previously, the distribution of HVDC is packaged within propulsion power panels with power interfaces to the generated and stored electrical energy sources and the propulsion electric motors. The low-voltage secondary distribution derived from the HVDC via the DC-to-DC converter feeds the secondary electrical system. The implementation of EMI filtering on the secondary electrical system is done via passive components, e.g., common-mode and differential mode inductors, capacitors, etc., or by deploying widely understood active filtering techniques.

Inverter Topology for in-Ground Charging a Hybrid or Electric Powertrain

In hybrid or electric aircraft, a significant fraction of the energy contained within the stored electrical energy sources is derived by charging these when the aircraft is on the ground, e.g., from the grid. Some energy can be regenerated while in the flight, but the primary means of replenishing the stored electrical energy sources on the aircraft is via a suitable charger on the ground.

Figure 4:
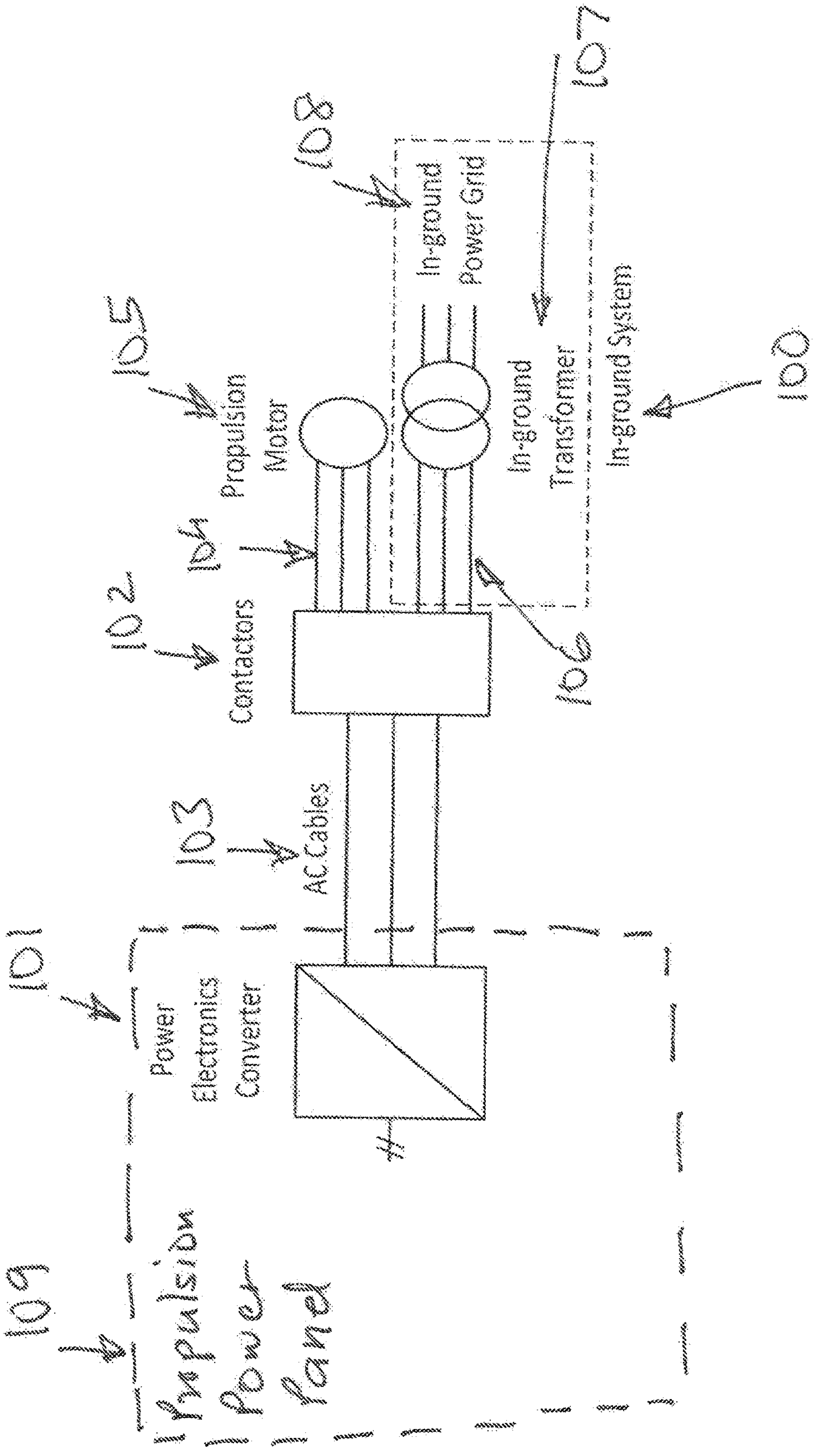
FIG. 4 is a schematic of an in-ground system to charge hybrid or electric powertrain leveraging a dual-use DC-AC converter of an embodiment.

In an innovative embodiment shown in FIG. 4, the charging on the ground is achieved via power electronics converters designed for dual-use to reduce cost and weight: (i) as an inverter to drive the propulsion motor, and (ii) as a converter for charging the stored electrical energy source on the ground. In FIG. 4, the DC-to-AC power electronics converter 101 is connected to a set of contactors 102 on the AC side via AC cables 103. One set of 3-phase AC cables 104 is connected to the propulsion electrical motor 105. When the propulsion electrical motor is operating, the contactors connect the converter to the motor to transfer energy from the generated and/or stored electrical energy sources to power the aircraft.

Charging is accomplished by an in-ground system 100 that connects to the contactor 102 via a set of 3-phase AC cables 106, either directly or via an intermediate interface. These cables 106 are in turn connected to an in-ground transformer 107 to provide the required matching voltage and isolation, while the primary side of the transformer is connected to the 3-phase in-ground power grid 108. When charging, the contactors for the propulsion electrical motor 105 are disconnected, and the contactors for the in-ground system 100 are connected, thereby enabling power flow from the AC side to the stored electric energy source appropriately routed by the propulsion power panel 109.

The power electronics converter 101 in the charging mode of operation is controlled as a boost active rectifier, where the peak of the AC side voltage is lower than the minimum voltage of the stored electrical energy source. The transformer 107 is designed with appropriate leakage inductance to act as the boost inductor. As a result, no additional filtering may be necessary within the aircraft to enable the charging operation.

Control Methods for Hybrid or Electric Powertrain

For a hybrid or electric powertrain with an inverter driving a propulsion electric motor, it is sometimes advantageous to minimize the total losses of the inverter and motor, rather than minimizing the losses of the inverter and motor separately. The losses are a function of several parameters, one of these being the switching frequency and the switching instants of the inverter, which depends on the pulse-width-modulation (PWM) method employed. The harmonics in the voltage waveform result in harmonics in the machine current, flux and torque, thereby resulting in harmonic losses in the motor and torque ripple on the shaft. As the machine fundamental frequency increases, the switching frequency also needs to be increased to maintain high power quality. This results in increasing losses on the inverter. A lower switching frequency shifts some losses from the inverter to the motor with higher torque ripple and vice-versa. The type of PWM method used also determines the common-mode voltage generated due to switching, which impacts EMI, bearing currents etc. and can be minimized as much as possible.

An embodiment of our novel control process uses a PWM method with pre-computed pulse-patterns that are synchronous to the fundamental voltage waveform. First, a cost function is defined with the parameters: (i) total losses in the inverter and motor; (ii) total harmonic distortion of the inverter voltage, which represents power quality; (iii) common mode voltage magnitude of the inverter voltage. Each parameter is bound within certain limits based on the specific implementation of the inverter and motor. Second, the cost function is minimized within these constraints by varying the pulse number and pulse pattern (width and location of the pulses) within a fundamental cycle of the voltage waveform, maintaining half-wave and quarter-wave symmetries. The computation of the pulse patterns is done over the entire operating range of the motor. A design of experiment (DOE) is conducted to minimize the number of computations and curve-fitting techniques are used to extrapolate the switching angles. Finally, a comprehensive look-up table of switching angles corresponding to the pulse patterns is generated as a function of output voltage magnitude, speed and load of the motor.

The motor controller runs closed loop current control to generate a voltage reference for the inverter. It then uses this look-up table to command the specific switching states of the inverter based on the voltage, current and fundamental frequency at that operating point.

Synchronized Operation Between Modular Inverters without External Filtering

For a hybrid powertrain at low voltage, e.g., less than 1 kVdc, the propulsion electric motor is often designed for high current. As an example, a 500 kW, 300V (line-to-line rms) motor with a rated power factor of 0.8 will have a rated current of 1200 A. This may lead the machine to be built with multiple segments, each segment housing a group of 3-phase windings. A machine with 3 segments has a current per phase group of 400 A, which is much easier to feed from an inverter. This design requires 3 modular inverters to be built and configured to drive each phase group. Such an operation of parallel inverters has the additional benefit of reducing the flux and torque ripple, while also minimizing voltage stresses between the windings of different phase groups.

Figure 5:
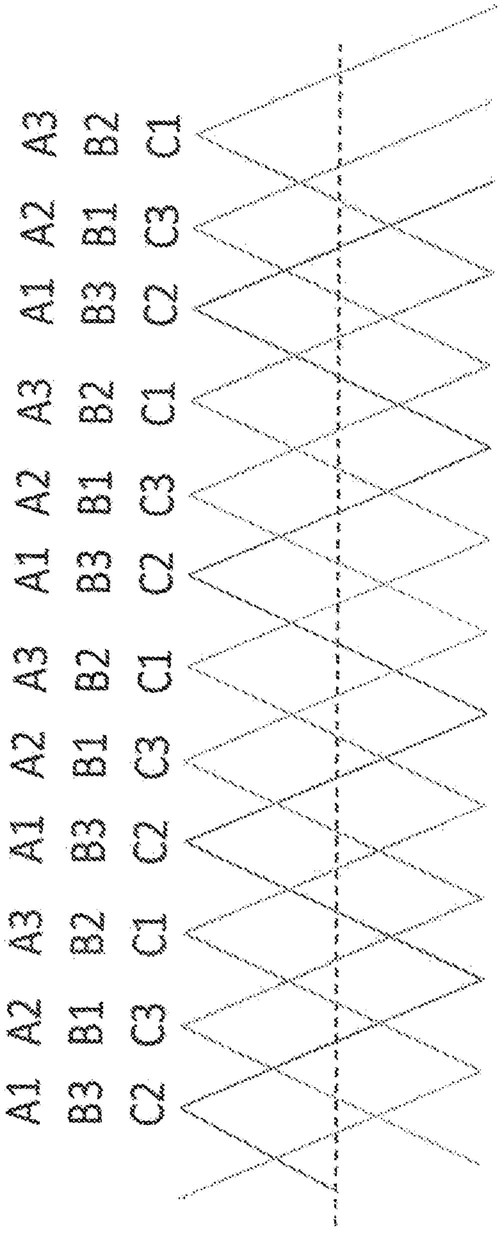
FIG. 5 shows interleaving between different phase groups and between phases in each group for an example of carrier waveforms with 3 phase groups of an embodiment.

In our novel embodiment, the relative switching instances between the inverters is tuned to minimize flux and torque ripples. Interleaving the switching between the different phase groups and between the phases in each group results in effective increase of the ripple frequency of the machine flux and torque. FIG. 5 demonstrates this for an example of carrier waveforms with 3 phase groups. The carriers corresponding to group 1 for the 3 phases are A1, B1, C1 (120° apart at switching frequency level). Group 2 phases are shifted by 120° from Group 1 and Group 3 phases are shifted by 120° from Group 2. So, A1-B3-C2 are represented by one carrier waveform, A2-B1-C3 by another carrier waveform and A3-B2-C1 by the 3rd carrier waveform. The carriers can be either synchronous or asynchronous to the fundamental. This results in an effective improvement of the flux and torque ripple by 3 times the carrier frequency and eliminates the need for external filtering.

In motor designs where coils from different phase groups share a slot in a segment, this type of interleaving will produce high differential voltage between the coils and will need suitable insulation to ensure long-term reliability. In such designs, the phase shifting between phase groups is avoided, however, the phase shifting between the phases is still effective.

Novel Cooling Systems and Methods for Hybrid and Electric Powertrain

Powertrain architectures for aircraft typically require active cooling of significant components including motors, generators, inverters, and in some cases wiring. In many cases, maximum sustained power output is directly related to the ability to effectively cool the electrical components. This challenge is significantly amplified when the powertrain is integrated within an aircraft where both space and weight are at a premium, and a heat exchanger exposed to free stream airflow will result in an aircraft drag penalty. Further, while liquid cooling may enable a more compact, lower weight component design, the liquid cooling system itself then requires plumbing, fluid, pumps and power for pumping all of which add weight and volume. Various embodiments suitable for cooling such a powertrain and/or PM generator are discussed herein. At the system level, these cooling architectures are suited for application go the modular PEBB and Power Center Backplate architecture, wherein each attached module is plugged into system level coolant flow on connection to Power Center.

Single-loop steady-state cooling of PEBBs: In one embodiment, steady-state cooling of PEBBs is achieved by introducing a closed loop coolant system containing a dielectric fluid (DF), for example 3M HFE-7500. This system consists of a central fluid reservoir, one or more coolant pumps, a filtering system, and a fluid-distribution manifold which distributes the flow evenly into all the PEBBs in the power panel. Within each panel, the pumped DF removes heat from heat sinks in each individual PEBBs, and then passes through an environmental HX to dump the heat prior to returning to the reservoir. In one embodiment, the cooling air for the HX is provided by the free stream flow. In another embodiment in which the cooling is directed at a generator, cooling air is siphoned from a duct connected to the generator turbine inlet scoop.

Multiple Cooling Loops: In another embodiment, two cooling loops are utilized. In one implementation, the previously described DF coolant loop dissipates heat from all the PEBBs that drive the propulsion motor; while the second loop utilizes a second coolant type appropriate to the operating temperature and heat flux requirements. In on implementation, the second loop working fluid consists of an equal percentage of ethylene-glycol-water (EGW) and provides cooling to the other PEBBs such as DC-DC converters, and active rectifier for the EPGS in the power panel. In such an embodiment, each loop is a complete system including two reservoirs, one for each DF and EGW, with their respective pumps and filtration systems. In one embodiment, the difference in operating temperatures of the coolant loops enable higher system efficiency. In this system a DF-EGW counter-flow HX exchanges heat from the outlet of the DF-cooled PEBBs to the inlet of the EGW-cooled PEBBs, and heat exchange to the environment is made with the EGW coolant loop and an air to EGW heat exchanger.

Single-loop Cooling of multiple components: According to another embodiment, the cooling system consists of a single loop of the motor and the central thermal system of the primary power panel. In this embodiment, a single pump and a filter system drives the same DF through the PEBBs and the propulsion motor(s). In one implementation, with sufficient fluid volume, the reservoir is omitted to save weight. In this embodiment, the cold DF is distributed evenly through the inlet PEBB-manifold, it is heated along the length of the PEBBs and is collected in the outlet PEBB-manifold. As a continuation of the single cooling loop, the same DF is now evenly distributed using a motor-manifold around the circumference of the propulsion motor. In this implementation, with a dielectric fluid as coolant, the windings are immersion-cooled. In another implementation, the motor coolant is provided by pumped two-phase cooling along the back-iron channels of the stator. In this implementation the final temperature of the DF is significantly above ambient presenting a challenge to minimize the weight and space of the environmental HX. In one implementation, this can be addressed with a dual-sided HX, in which, the first side is cooled from the vapor-compression air-conditioning system, and the other side from ram-air provided by free stream air flow.

Phase-change cooling, Background: Phase change immersion-cooling, and in particular boiling, has emerged as the primary choice for extremely-high heat flux dissipation from high-efficiency silicon-carbide (SiC) power electronics. A key limiting boiling phenomenon that prevents safe operation of power switching devices at full-load is the critical heat flux (CHF): a cataclysmic failure point where the surface is completely blanketed by vapor and the efficacy of surface heat transport is throttled by several orders of magnitude, beyond which the surface experiences severe burnout.

Theoretical and experimental research has been conducted to study the key passive methods that could potentially delay the onset of CHF. Surface wettability (contact angle) and texturing has been shown to influence a number of aspects of boiling heat transfer, mainly the CHF, surface superheat, and bubble incipience, departure and frequency characteristics. In general, heat transfer coefficients (HTC) are higher for less-wetting surfaces (surfaces with contact angle exceeding 90 degrees), as a result of low superheat at bubble incipience and high bubble nucleation density; conversely, CHF is higher for more-wetting surfaces (surfaces with contact angle below 90 degrees), due to effective rewetting of the surface after bubble departure. As it is extensively pointed out in the literature, textured super-hydrophilic (more-wetting) surfaces have shown significant enhancement in CHF through capillary wicking, albeit with moderate HTC. On the other hand, super-hydrophobic (less-wetting) surfaces reduce the CHF and transition to film boiling with high HTC. The two possible wetting states on textured superhydrophobic surfaces during nucleate boiling are: the Cassie-Baxter state, where the liquid rests on top of the micro-/nano-structures and vapor is trapped in the rough solid-liquid interface regions leading to low frequency in bubble departure (~0.2 Hz); and the Wenzel state which limits vapor spreading and maintains nucleate boiling to a much higher CHF than Cassie-Baxter state at higher bubble departure frequencies (~31 Hz). The trade-off between two desirable thermal performance traits (high CHF and high HTC) as a function of surface wettability is the driving motivation behind this invention.

Improved multi-phase heat transport using a laser etched biphilic surface incorporating copper nanowires: According to an embodiment, the favorable boiling heat transport characteristics of hydrophobicity without simultaneous reduction in CHF are obtained utilizing a symbiotically-textured surface (or a biphilic surface) which comprises of hydrophobic regions that act as nucleation sites on a uniform hydrophilic surface. This renders a textured surface, either with nanostructures or microstructures, that shows concomitant enhancement in HTC and CHF compared to conventional flat surfaces and uniform hydrophilic surfaces. In this embodiment the textured surface is synthesized in two steps: laser etching to produce a carpet of micro-structured pillars on a flat surface of the heated switching device (act as super-hydrophilic); and chemical etching of copper nanowires (act as super-hydrophobic) on the top face of the pillars.

The innovation of applying phase change immersion cooling system using biphilic textured surfaces can significantly improve the thermal performance by increasing the frequency of bubble ebullition and allowing for periodic renewal of colder liquid to replace the departing bubbles. The CHF is increased dramatically which allows for bulk liquid temperature operation closer to the saturation temperature (boiling point) of the fluid. This reduces the thermal load on the central aircraft thermal management system that exchanges heat between air and the PEBB thermal system.

Self-Cavitating Multi-Jet Impingement Boiling for Surfaces with Very High Heat Flux:

Background: As the trend of high-power electronics and concomitant miniaturization escalates to faster switching devices and rising demands on control, aerospace/aviation-grade inverters continue to become more compact in response to size limitations, reliability requirements and weight restrictions. The result is an increasing surface heat flux at the power module level; the transistor packages of a SiC (silicon-carbide) IGBT (insulated gate bipolar transistor) module approach 0.3-0.4 kW/cm$^2$, while GaN (gallium-nitride) wide bandgap transistor electronics encounter intense power densities of 1 kW/cm$^2$. In addition to the inability to provide heat removal capacity of such magnitudes, the present cooling solutions suffer from two major drawbacks: a thermal-interface-material (TIM) between the power semiconductors and the heat sink that contributes massively to the net thermal resistance; and the presence of a temperature gradient along the module surface in the direction of fluid flow, which increases with the power capability of the module. Therefore, thermal management of the high-power-density inverters requires state-of-the-art cooling strategies capable of overcoming these pitfalls, and continuously dissipating high heat fluxes (~0.5-1 kW/cm$^2$) while maintaining the switching devices below their maximum allowable junction temperature, thereby optimizing the package for minimum volume, weight and pumping power.

Superposition of phase-change heat transfer (pool boiling in this case) with high convection heat transfer coefficients achieved by submerged jet impingement, wherein the liquid jet issues from a nozzle onto a surface surrounded by a fluid medium with the same environment as the jet, can enhance heat removal capability while also providing temperature uniformity. The sweeping of vapor bubbles nucleating from the heated surface by the impinging liquid jet increases the surface heat flux due to the latent heat of vaporization. The heat transfer regimes observed in phase change jet impingement as the surface heat flux rises include: a single-phase regime before boiling incipience, a partial-boiling regime, and a fully-developed nucleate boiling regime, followed by critical heat flux (CHF) beyond which the surface experiences burnout. During the transition from single-phase regime to fully-developed nucleate boiling regime in the presence of a dielectric fluid, the heated surface of the power module undergoes a temperature overshoot, which is essentially the difference in the surface superheat (difference between the surface temperature and the bulk fluid temperature) attained before and after boiling incipience. The surface can encounter temperatures from 25° C.-40° C. above the boiling point of the fluid during temperature overshoot; this is cardinal in temperature-sensitive applications such as power electronics because failure to initiate boiling can cause severe damage to the power module.

Overshoot prevention with higher heat flux through modified jet nozzles: In one embodiment a geometrical modification to the jet nozzle that eliminates the temperature overshoot of the heated surface. A "self-cavitating" nozzle is described wherein a concentric collar is attached at the tip of the circular jet nozzle. The collar provides an expansion region for the jet flow at the exit of the nozzle that creates a pressure drop, which in turn results in the generation of a cloud of cavitation bubbles that impinge on the heated surface. These impinging cavitation bubbles slide over the heated surface, thus providing the liquid-vapor interface essential for an early onset of boiling and elimination of temperature overshoot. In addition, the inherent flow oscillations produced by the cavitation bubbles enhance the surface heat transfer rate per unit coolant mass flux beyond that is currently achieved by jet impingement, with no additional pumping power.

In an embodiment, the cross-section of the cooling device contains multiple self-cavitating jets impinging onto a pair of SiC power semiconductors (IGBT and diode). The device contains an inlet manifold with channels that distribute flow evenly into each self-cavitating nozzle, and a similar outlet manifold that collects the spent liquid through a pair of siphoning sections situated on either side of the self-cavitating nozzle. As cavitation occurs near the tip of the collar at a certain threshold jet Reynolds number and collar-to-nozzle spacing, the flow disturbances introduced by the cavitation bubbles periodically renew the hydrodynamic and thermal boundary layers by pushing the vapor bubbles nucleating from the heated surface and directing them into the siphoning sections of the fluid chamber. The temperatures of the fluid chamber and the jet are maintained several degrees below the boiling point of the fluid, and this allows rapid condensation of the vapor bubbles inside the pool within the siphoning sections of the chamber, thereby not allowing vapor bubbles to occlude the outlet manifold.

In this embodiment, localized surface heat transfer capabilities up to 10 W/cm$^2$-K are achievable with improved surface temperature uniformity than the currently utilized single-phase and two-phase heat transfer solutions. Further, the cooling device is designed to particularly work with dielectric fluids enabling switching devices to be completely immersed in the liquid chamber for a compact packaging of power-electronic-building-blocks (PEBBs). The direct contact of switching devices with a dielectric fluid means that even in the absence of boiling heat transfer, the combination of self-cavitating bubbles and jet impingement would provide adequate cooling with heat transfer coefficients of the order of 0.5-2 W/cm$^2$-K.

Since the flow rates for the nozzle, even at turbulent jet Reynolds numbers, are lower than the flow rates for orthodox forced convection cooling solutions, the pumping power is remarkably small—this means that the weight and volume of the ancillary equipment such as pumps, flow monitoring systems, fittings are also minimized.

Microchannel Heat Sink for Two-Phase Cooling, Background:

High-power SiC switching devices experience heat fluxes exceeding 1 kW/cm$^2$, which must be dissipated while maintaining the device junction temperatures at levels safe for reliable operation. Current cooling solutions are indirect and utilize a heat sink that is separated from the silicon die with heat spreaders inserted between. Large temperature rises across this stack occur due to the parasitic thermal interface and spreading resistances between the switching device and the attached heat sink. Additionally, heterogeneous heating—specifically localized hotspot heating—can cause extreme temperature variations across device surfaces. These application trends necessitate the development of transformative cooling strategies, with coolant channels deployed directly on the semiconductor device. While direct cooling allows for reduced thermal (conduction) resistances and eliminates contact resistances, there is little material thickness between the heat-generating device and the heat sink available for heat-spreading; this exposes the heat sink directly to heat fluxes generated from the device and entails higher heat transfer coefficients to maintain the low thermal resistance across the heat sink. Local hotspots also lead to high local junction temperatures and large temperature gradients across the device.

Heat sinks containing deep, high-aspect-ratio microchannels provide high heat transfer coefficients and large area enhancement, which them an ideal candidate for high-heat-flux applications. Single-phase microchannel heat sinks have been widely studied for power electronics cooling and the consensus is that the pressure drop along the length of the channels leads to large pumping power requirements at small channel diameters and high flow rates.

Two-phase operation can enable reductions in size, weight and overall pumping power consumption when compared to single-phase systems. Phase change evaporative cooling in traditional microchannel heat sinks has been widely explored and found to improve surface temperature uniformity and heat dissipation efficacy relative to single-phase cooling. A traditional microchannel heat sink contains a single inlet, an array of microchannels spanning the entire device length, and a single outlet. Even with the advent of evaporative cooling designs, the maximum heat dissipation of these traditional microchannel heat sinks remains limited by impractically large pressure drops as the channel dimensions decrease and vapor volume fractions increase.

Figure 6:
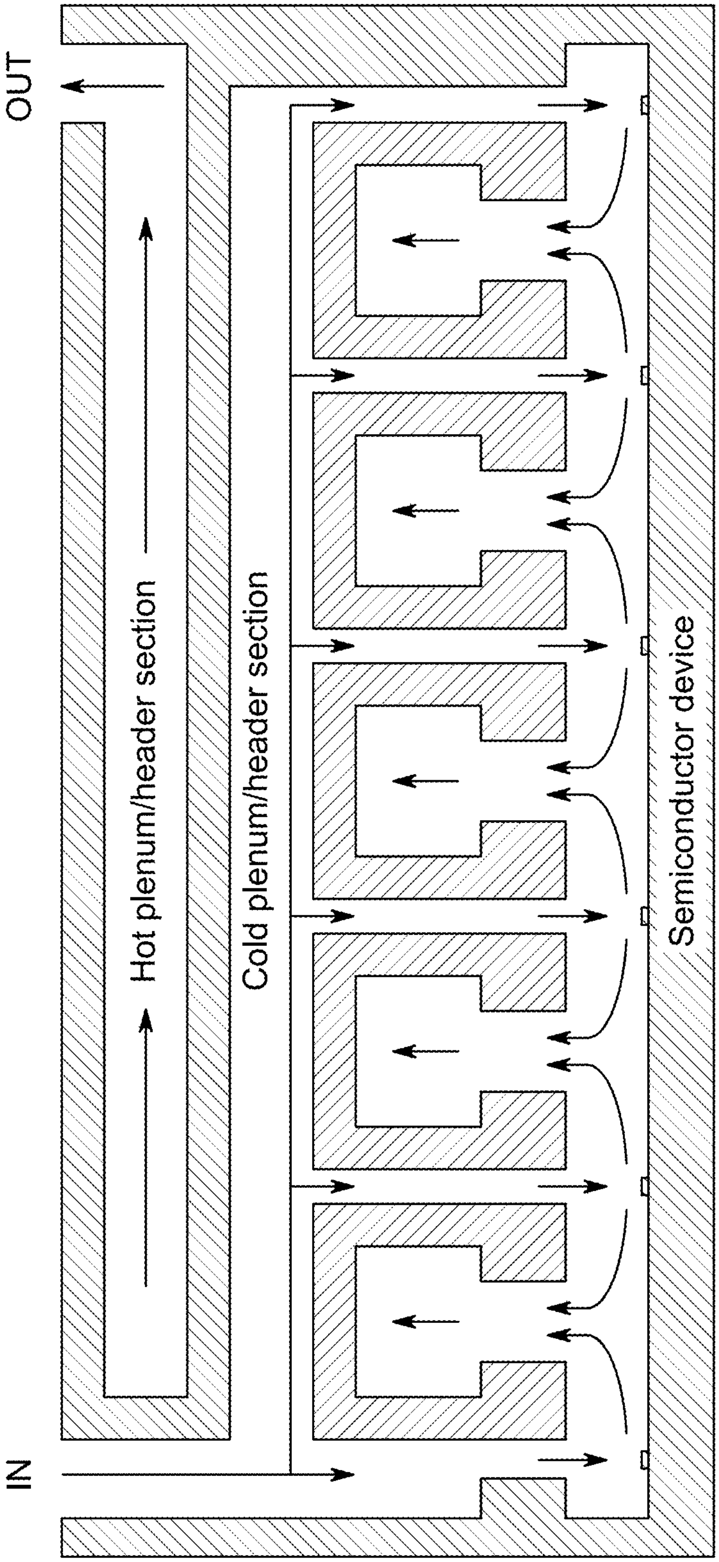
FIG. 6 is an illustration of a micro channel heat sink suitable for two-phase cooling for applications with extremely high heat flux requirements, according to an embodiment.
Figure 7:
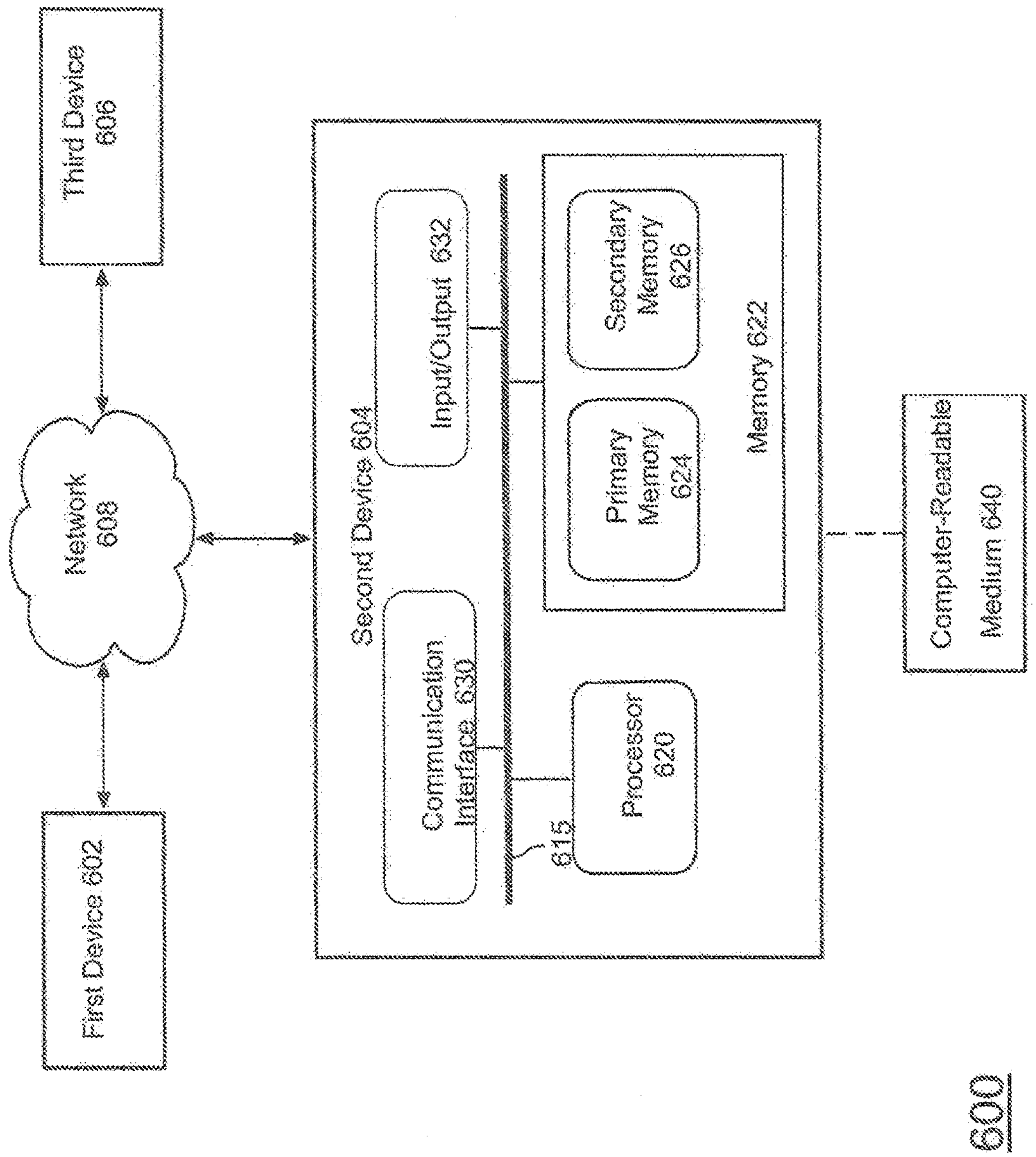
FIG. 7 is a schematic diagram illustrating an implementation of an example computing environment.

According to an embodiment depicted in FIG. 6, dimensions of the device being cooled can be decoupled from the flow length by the introducing the working fluid at multiple locations along the length of the microchannels, resulting in multiple flow paths of decreased effective flow length. A multi-level, structured microchannel heat sink where the heated surface is discretized into banks of multiple heat sinks, each with its own dedicated inlet and outlet fed in parallel. The pressure drop is significantly reduced at a given mass flux due to the decrease in channel flow length. The heat sink contains inlet and outlet headers with parallel flow passages that span the width of the switching device. The flow impinges on the channel base, splits and travels along the channel in both directions, and exits the channel through the plenum chamber.

In some instances, due to increased number of parallel flow paths in this microchannel heat sink, flow maldistribution between channels, caused by uneven pressure drop within the manifold, can cause significant performance reduction and temperature heterogeneity. In order to mitigate this, the manifold passages leading to the individual channels increase in cross-sectional area and are located in the flow direction such that each parallel microchannel encounters the same pressure drop.

In many power electronics cooling applications, non-uniform heat generation is common. This microchannel heat sink design limits the lateral temperature gradients on the surface of the switching device and ensures localized cooling of hotspots depending on the spatial location of the junction of the switching device. The banks of small-width and high-aspect-ratio microchannels reduce the overall pressure drop of the thermal system by decreasing the effective flow length of all parallel flow paths within the system.

Fail-Safe Cooling: An embodiment of the innovations described herein relates to an aircraft with multiple redundancies in the powertrain including a plurality of propulsors, each of which are driven by one or more motors, a plurality of stored energy sources, for example batteries, and further may include one or more sources of generated power. In one embodiment, such a series-hybrid electric aircraft is configured with two channels—left and right—that each deliver power from energy sources to motor loads. There is a connection between the two such that if one side fails, then the other side can re-route power to support the deficiency. For example, if the left load motor fails, then the right motor can be driven beyond its typical operating point with additional power coming from the left battery. In such a situation, if the motor is driven beyond its normal continuous operating point, it will eventually overheat without additional cooling. A similar example can be considered with the power electronics that drive the motor. If multiple inverters are used to drive a single motor and one of the inverters fails, then the other two can be operated at much higher power levels for a limited period of time in an effort to compensate.

In one embodiment in which a single loop, single fluid cooling system feeds a set of power electronics and electric machines in a hybrid-electric or purely electric powertrain architecture, the system controller can redirect coolant from faulted components to healthy components. This redirection is made through actively controlled valves in distribution channels or manifolds, and is made simultaneously with the re-direction of power to the healthy components to mitigate the additional thermal demands.

In a second embodiment in which there are multi-loop, multi-coolant systems, as previously described, the redirection logic is specific to each separate such cooling system.

The invention claimed is:

1. A hybrid electric powertrain system for an aircraft, comprising:
- an alternating current (AC) power generation system comprising an AC power source and a rectifier unit coupled to the AC power source;
- a high-voltage direct current (HVDC) energy storage device having a battery voltage;
- an HVDC bus coupled to the HVDC energy storage device and the rectifier unit, configured to supply power to a propulsion load; and
- a system controller configured to:
  - determine a desired power distribution between the AC power source and the HVDC energy storage device;
  - generate an HVDC bus reference voltage based, at least in part, on the desired power distribution and the battery voltage; and
  - issue a command to the AC power generation system for adjustment of a voltage of the HVDC bus provided by the rectifier unit to match the HVDC bus reference voltage, thereby to control a power flow between the AC power source and the HVDC energy storage device.

2. The hybrid electric powertrain system of claim 1, wherein the rectifier unit comprises an active rectifier, and the command is transmitted to the active rectifier to control switching operations of the active rectifier.

3. The hybrid electric powertrain system of claim 1, wherein the AC power source comprises a wound-field generator controlled by a Generator Control Unit (GCU) and the rectifier unit; and wherein the command is transmitted to the GCU to initiate adjustment to excitation of the wound-field generator.

4. The hybrid electric powertrain system of claim 1, wherein the system controller is further configured to:
- measure an actual power output of the AC power source and the HVDC energy storage device;
- determine a measured power distribution based, at least in part, on the actual power output of the AC power source and the HVDC energy storage device; and
- adjust the HVDC bus reference voltage using a feedback control loop based, at least in part, on a difference between the desired power distribution and the measured power distribution.

5. The hybrid electric powertrain system of claim 1, wherein the desired power distribution is received as a command from an Aircraft Management System (AMS), the AMS to optimize an overall energy usage and/or reduce a fuel burn during a flight mission.

6. The hybrid electric powertrain system of claim 1, wherein the system controller is configured to determine the desired power distribution based, at least in part, on a current flight phase, a state of charge (SOC) of the HVDC energy storage device or a remaining fuel level associated with the AC power source, or a combination thereof.

7. The hybrid electric powertrain system of claim 1, further comprising a power panel comprising controllable electrical switches, wherein the system controller is further configured to:
- identify a faulty component within the hybrid electric powertrain system based, at least in part, on monitored operating parameters; and
- send a switching configuration command to the power panel to electrically isolate or limit a performance capability of the faulty component.

8. A method for controlling power flow in a hybrid electric powertrain, the hybrid electric powertrain comprising an AC generation system including a generator and a rectifier unit, coupled to an HVDC bus and an HVDC battery coupled to the HVDC bus, the method comprising:
- monitoring a current flowing from or to the HVDC battery;
- determining, via a system controller, a target HVDC bus voltage sufficient to modify the monitored current toward a desired battery current level, wherein the desired battery current level is based, at least in part, on a safe operating limit of the HVDC battery;

transmitting a control signal representing the target HVDC bus voltage to the AC generation system; and controlling the AC generation system, in response to the control signal, to adjust a voltage of the HVDC bus relative to a voltage of the HVDC battery, thereby controlling the current flowing from or to the HVDC battery.

9. The method of claim 8, wherein the rectifier unit comprises an active rectifier, and the control signal is transmitted to the active rectifier to control switching operations of the active rectifier.

10. The method of claim 8, wherein the AC generation system comprises a wound-field generator controlled by a Generator Control Unit (GCU) and the rectifier unit; and wherein the control signal is transmitted to the GCU to adjust excitation of the wound-field generator.

11. The method of claim 8, wherein the safe operating limit comprises a maximum discharge rate, and wherein determining the target HVDC bus voltage comprises increasing the target HVDC bus voltage relative to the voltage of the HVDC battery responsive to the monitored current exceeding the maximum discharge rate.

12. The method of claim 8, wherein the safe operating limit comprises a maximum charge rate, and wherein determining the target HVDC bus voltage comprises decreasing the target HVDC bus voltage relative to the voltage of the HVDC battery responsive to the monitored current exceeding the maximum charge rate.

13. The method of claim 8, wherein the safe operating limit is dynamically adjusted based, at least in part, on a monitored temperature or State of Charge (SOC) of the HVDC battery.

14. The method of claim 8, further comprising:

generating an alert signal to initiate aircraft descent responsive to determination that a state of charge (SOC) of the HVDC battery is below a minimum SOC reserve and determination that a fuel reserve associated with the AC generator is below a minimum fuel reserve.

15. A hybrid electric powertrain system for an aircraft, comprising:

a permanent magnet (PM) generator;

an HVDC battery;

an active rectifier unit coupling the PM generator to an HVDC bus shared with the HVDC battery; and a system controller configured to:

receive a command indicating a desired power split between the PM generator and the HVDC battery;

determine an output current requirement for the active rectifier unit based, at least in part, on the desired power split; and control switching modes of the active rectifier unit to regulate an output current of the active rectifier unit to match the output current requirement;

wherein a proportion of power delivered by the PM generator relative to the HVDC battery is controlled by regulation of the output current of the active rectifier unit.

16. The system of claim 15, wherein the system controller is configured to control the switching modes of the active rectifier unit while maintaining a shaft speed of the PM generator at a substantially constant speed.

17. The system of claim 15, wherein the system controller is configured to determine rotor position information by simultaneously utilizing inputs from a physical position sensor and estimations from a sensor-less algorithm.

18. The system of claim 17, wherein the system controller is further configured to utilize measurements from the physical position sensor to tune the sensor-less algorithm in real-time to ensure alignment between the physical position sensor and the sensor-less algorithm.

19. The system of claim 17, wherein the system controller is configured to transition seamlessly from utilizing the physical position sensor to utilizing the sensor-less algorithm responsive to detection of a failure or loss of signal integrity associated with the physical position sensor.

20. The system of claim 15, wherein the system controller is configured to implement a field-oriented control algorithm to control the switching modes of the active rectifier unit based, at least in part, on rotor position information for the PM generator.

21. The system of claim 20, wherein the rotor position information is determined by simultaneously utilizing inputs from a physical position sensor and estimations from a sensor-less algorithm.

* * * * *